(12) United States Patent
Sinop et al.

(10) Patent No.: US 7,889,924 B2
(45) Date of Patent: Feb. 15, 2011

(54) GLOBALLY OPTIMAL UNINITIALIZED GRAPH-BASED RECTILINEAR SHAPE SEGMENTATION

(75) Inventors: Ali Kemal Sinop, Princeton, NJ (US); Leo Grady, Yardly, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 980 days.

(21) Appl. No.: 11/784,836

(22) Filed: Apr. 10, 2007

(65) Prior Publication Data

US 2008/0037871 A1 Feb. 14, 2008

Related U.S. Application Data

(60) Provisional application No. 60/790,739, filed on Apr. 10, 2006.

(51) Int. Cl.
- *G06K 9/34* (2006.01)
- *G06K 9/46* (2006.01)
- *G06K 9/66* (2006.01)

(52) U.S. Cl. ...................................... 382/173; 382/190

(58) Field of Classification Search ................. 382/173, 382/190, 203
See application file for complete search history.

(56) References Cited

U.S. PATENT DOCUMENTS

| | | | |
|---|---|---|---|
| 6,078,688 A * | 6/2000 | Cox et al. | 382/173 |
| 6,516,092 B1 | 2/2003 | Bachelder et al. | |
| 6,744,923 B1 * | 6/2004 | Zabih et al. | 382/226 |
| 7,095,890 B2 | 8/2006 | Paragios et al. | |
| 2004/0013305 A1 * | 1/2004 | Brandt et al. | 382/224 |
| 2006/0050959 A1 * | 3/2006 | Grady et al. | 382/173 |
| 2006/0062457 A1 * | 3/2006 | Grady | 382/173 |
| 2006/0104510 A1 * | 5/2006 | Aharon et al. | 382/173 |
| 2006/0147115 A1 * | 7/2006 | Grady | 382/173 |
| 2006/0147126 A1 * | 7/2006 | Grady | 382/274 |
| 2006/0165284 A1 * | 7/2006 | Aharon et al. | 382/173 |
| 2006/0239554 A1 * | 10/2006 | Sun et al. | 382/173 |
| 2007/0025616 A1 * | 2/2007 | Grady et al. | 382/173 |
| 2007/0047810 A1 * | 3/2007 | Grady | 382/173 |
| 2007/0086647 A1 * | 4/2007 | Grady | 382/154 |
| 2007/0292025 A1 * | 12/2007 | Boykov et al. | 382/173 |
| 2008/0226169 A1 * | 9/2008 | Grady | 382/173 |
| 2008/0247646 A1 * | 10/2008 | Chefd'hotel et al. | 382/173 |
| 2008/0260247 A1 * | 10/2008 | Grady et al. | 382/173 |

OTHER PUBLICATIONS

P.Amestoy, et al., "Algorithm 8xx: AMD, an approximate minimum degree ordering algorithm" ACM Trans. on Math. Software, 30(3):381-388, Sep. 2004.

(Continued)

*Primary Examiner*—Samir A Ahmed
*Assistant Examiner*—Li Liu
(74) *Attorney, Agent, or Firm*—Donald B. Paschburg

(57) ABSTRACT

An improved method of graph-based segmentation of objects in images uses the property of rectilinear shape classes which optimize the ratio of specific metrics, that can be expressed as Laplacian matrices applied to indicator vectors. A relaxation of the binary formulation of this problem allows a solution via generalized eigenvectors. This segmentation algorithm incorporating shape information requires no initialization, is non-iterative and finds a steady-state (i.e., global optimum) solution. The method is generally applicable to segmentation of rectilinear shapes.

18 Claims, 12 Drawing Sheets

OTHER PUBLICATIONS

Y. Boykov and M.-P. Jolly, "Interactive graph cuts for Optimal Boundary & Region Segmentation of Objects in N-D Images" in Proc. of ICCV 2001, pp. 105-112, 2001.

Y. Boykov and V. Kolmogorov, "Computing Geodesics and Minimal Surfaces via Graph Cuts" In Proc. of ICCV, vol. 1, Oct. 2003.

Y. Boykov, et al., "Fast Approximate Energy Minimization via Graph Cuts" IEEE PAMI, 23(11):1222-1239, Nov. 2001.

T. Cour, et al., "Spectral Segmentation with Multiscale Grpah Decomposition" IEEE CVPR 2005, vol. 2, pp. 1124-1131.

D. Freedman and T. Zhang, "Interactive Graph Cut Based Segmentation With Shape Priors" IEEE CVPR 2005, vol. 1, pp. 755-762.

L. Grady, "Multilabel Random Walker Image Segmentation Using Prior Models" In Proc. of IEEE CVPR 2005, vol. 1, pp. 763-770, Jun. 2005.

L. Grady and E.L. Schwartz, "Isoperimetric Graph Partitioning for Image Segmentation" IEEE Trans. on Pat. Anal. and Mach. Int., 28(3):469-475, Mar. 2006.

M.P. Kumar, et al., presentation slides titled "OBJ CUT" from Proc. of CVPR 2005.

J. Shi and J. Malik, "Normalized Cuts and Image Segmentation" IEEE PAMI, 22 (8):888-905, Aug. 2000.

G. Slabaugh and G. Unal., "Graph Cut Segmentation Using an Elliptical Shape Prior" In 2005 IEEE Int'l Conference on Image Processing.

D. Tolliver, et al., "Corrected Laplacians: Closer Cuts and Segmentation with Shape Priors" In IEEE CVPR '05, vol. 2, pp. 92-98.

S.X. Yu and J. Shi, "Multiclass Spectral Clustering" In Ninth IEEE Int'l Conference on Computer Vision, vol. 1, pp. 313-319, Oct. 2003.

J. Zunic and P. Rosin, "Rectilinearity Measurements for Polygons" IEEE Trans. on PAMI, 25(9):1193-1200, Sep. 2003.

* cited by examiner

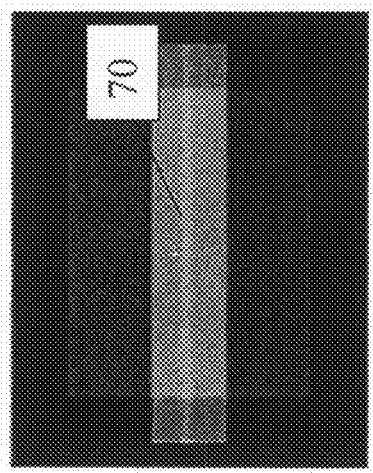
FIG. 7(a)
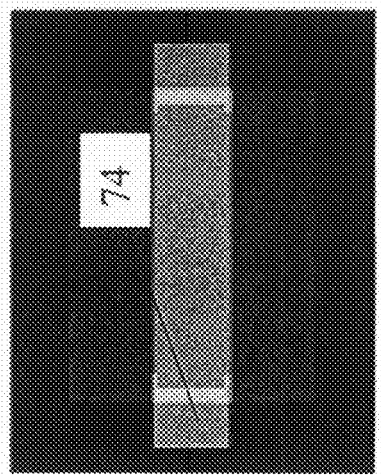
FIG. 7(b)
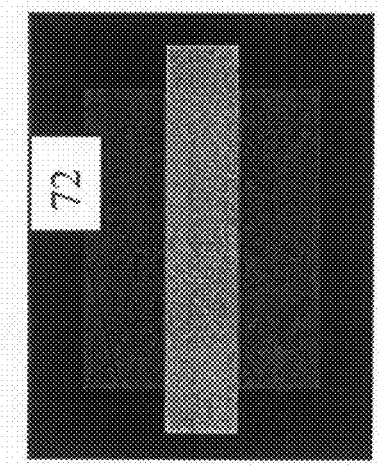
FIG. 7(d)
FIG. 7(c)

GLOBALLY OPTIMAL UNINITIALIZED GRAPH-BASED RECTILINEAR SHAPE SEGMENTATION

CROSS-REFERENCE TO RELATED CASES

This is a U.S. non-provisional application of U.S. provisional patent application Ser. No. 60/790,739, filed Apr. 10, 2006, by Sinop et al., the entirety of which application is incorporated herein by reference.

FIELD OF THE INVENTION

The present invention relates to machine vision image data processing and, more particularly, to a method for segmenting rectilinear shapes in an image.

BACKGROUND

One of the challenges in image segmentation algorithms is incorporating shape priors. Graph-based segmentation algorithms have recently gained in popularity. Without using shape priors, the graph-based segmentation methods such as minimum cuts (see Y. Boykov and M. P. Jolly, "Interactive Graph Cuts for Optimal Boundary & Region Segmentation of Objects in N-D Images," *In Proc. of ICCV* 2001, pp. 105-112, 2001), Normalized Cuts (see J. Shi and J. Malik, "Normalized Cuts and Images Segmentation," *IEEE PAMI,* 22(8):888-905, August 2000), isoperimetric partitioning (see L. Grady and E. L. Schwartz, "Isoperimetric Graph Partitioning for Image Segmenation," *IEEE Trans. on Pat. Anal. And Mach. Int.,* 28(3):469-475, March 2006) and random walker (see L. Grady, "Multilabel Random Walker Image Segmentation Using Prior Models," *In Proc. of* 2005 *IEEE Computer Society Conference on Computer Vision and Pattern Recognition,* Vol. 1, pp. 763-770, San Diego, June 2005) provide steady-state, globally optimal solutions. For example, the Normalized Cuts algorithm is a graph partitioning algorithm that has previously been used successfully for image segmentation. It is originally applied to pixels by considering each pixel in the image as a node in the graph. To improve these graph-based segmentation methods, attempts have been made to incorporate shape information into these segmentation algorithms. These attempts, however, have destroyed the global optimality of the solutions and required an initialization.

Several attempts have been made to incorporate shape information into graph-based segmentation algorithms, but so far all of them have yielded algorithms that do not provide global optimality. One of these approaches was introduced by Freedman and Zhang (see D. Freedman and T. Zhang, "Interactive Graph Cut Based Segmentation with Shape Priors," *In Proc. of IEEE Computer Society Conference on Computer Vision and Pattern Recognition,* Vol. 1, pp. 755-762, 2005), where they assume that the shape has a fixed template that may be translated, rotated and scaled. They first fit the shape to the image and construct a distance map, which is later added as an additional term to the energy functional. The solution is found using graph cuts with binary labeling (see Y. Boykov, O. Veksler and R. Zabih, "Fast Approximate Energy Minimization via Graph Cuts," *IEEE PAMI,* 23(11):1222-1239, November 2001) among several image scales, and selecting the one with minimum normalized energy score. Tolliver et al. (see D. Tolliver, G. L. Miller and R. T. Collins, "Corrected Laplacians: Closer Cuts and Segmentation with Shape Priors," *In Proc. of* 2005 *IEEE Computer Society Conference on Computer Vision and Pattern Recognition,* Vol. 2, pp. 92-98, 2005) proposed an iterative algorithm for shape based segmentation. They first parameterize the shapes using Principal Component Analysis on the space formed by training shapes. At each subsequent iteration, they find a shape model for the existing segmentation and guide the segmentation using this shape model. Another approach taken by Kumar et al. (see M. P. Kumar, P. H. torr and A. Zisserman, "OBJ CUT," *In Proc. of IEEE Computer Society Conference on Computer Vision and Pattern Recognition,* Vol. 1, pp. 18-25, 2005) was to add a shape prior term in a Markov Random Field segmentation framework. This shape prior term was updated after each segmentation in a Expectation Maximization framework to produce a solution with local energy minimum. In a similar framework, Slabaugh and Unal (see G. Slabaugh and G. Unal, "Graph Cut Segmentation Using an Elliptical Shape Prior," *In* 2005 *IEEE International Conference on Image Processing,* 2005) proposed using elliptical shape priors in the context of graph cuts segmentation. In their work, the cut is constrained to lie on an elliptical band which is also updated iteratively according to the result of previous segmentation. All of these methods rely on guiding the image cut with an estimate of the shape.

The drawbacks of these shape-based segmentation algorithms require an initialization and, thus, do not provide globally optimal solution. It is difficult to predict or describe their behavior. Therefore, an improved shape-based segmentation algorithm is desired that provides globally optimal solution that does not require initialization, allows thorough analysis and predict its behavior.

SUMMARY

According to an embodiment, a new method for segmenting one or more rectilinear shapes in a digital image and an apparatus for carrying out that method are disclosed. The image is cut to form a segmentation graph based on the cuts. The method incorporates specific shape information into graph based segmentation that leads to a spectral partitioning framework and allows for the computation of the global optimum.

An embodiment of the method of segmenting a rectilinear object in an image comprises making graph-based cuts of the object in the image, approximating a ratio of perimeter metrics $$\operatorname*{argmin}_{x} \frac{x^T L_1 x}{x^T L_2 x},$$

subject to $[x \in \{0,1\}^N]$, where N is the size of the graph, for the object by constructing Laplacian matrices $L_1$ and $L_2$ for the image. The optimization of this ratio is solved by relaxing the integer constraint on the ratio of perimeter metrics resulting in a generalized eigenvector problem, solving the generalized eigenvector problem and thresholding the output to find a binary segmentation from the eigenvector solution.

According to another embodiment, segmentation of multiple rectilinear shapes in an image is done by sequentially segmenting one object at a time using the segmentation algorithm of the invention. Once the first rectilinear object/shape is segmented, the segmented object is "removed" from the image by multiplying the weights of the object border by an attenuation parameter $v$ and the segmentation algorithm is operated on the image again. These steps are continued until the desired number of objects are segmented.

The specific class of shapes for which the segmentation is optimized are rectilinear shapes. However as long as the shape being sought satisfies a certain condition—being the unique minimum of certain metrics' ratios—this framework can be extended to other shapes as well. Since the optimization is performed for the ratio of the cut, as measured by two metrics, the method described herein will be referred to as the opposing metrics (OM) algorithm or method. This method is useful for segmentation of multiple objects.

The basis of the OM algorithm is to connect the fact that certain shapes optimize the ratio of perimeters as measured by different metrics with the fact that such metrics can be represented by the weighted connectivity of the graph cuts. By that process, the OM algorithm transforms the segmentation into a generalized eigenvector problem, which can be solved with standard algorithms.

According to another embodiment, a storage media tangibly embodying a program of executable instructions readable by a machine, such as a general purpose computer, wherein the program of executable instructions comprising the computational algorithm described herein for segmenting a rectilinear object in an image. According to another embodiment, a hardware system for segmenting a rectilinear object in an image is described. Such system comprises a means for reading the program of executable instructions tangibly embodied in the storage media, a storage means for storing the program of executable instructions, and a processor for performing the executable instructions.

on the neighborhood size and resolution.

Figure 5C:
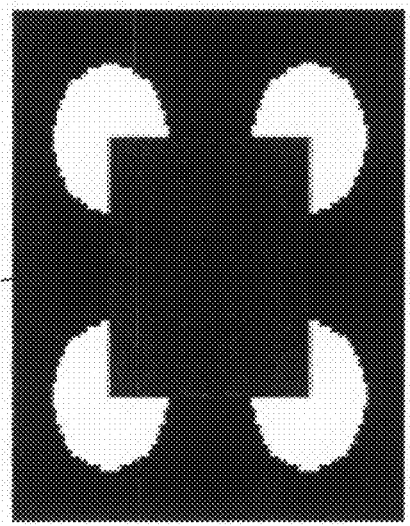
Figure 5B:
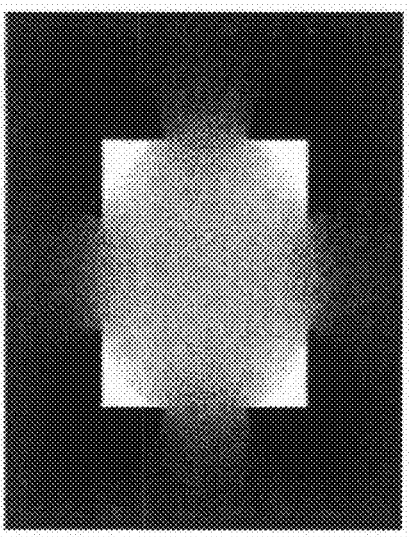
Figure 5A:
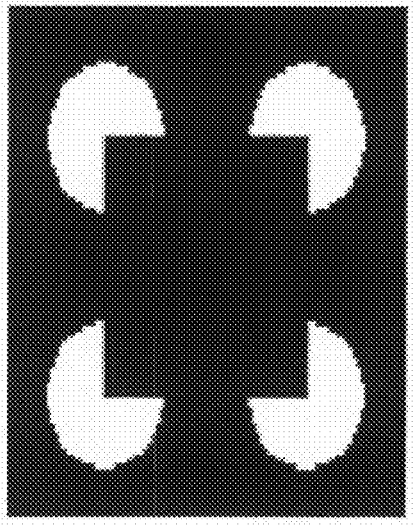

FIGS. 5(a)-5(c) illustrate the results of a segmentation on a Kanizsa square using the OM algorithm described herein.

Figure 6C:
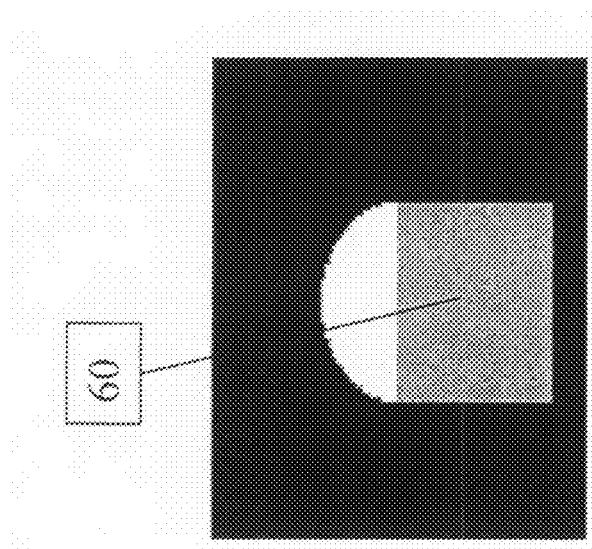
Figure 6B:
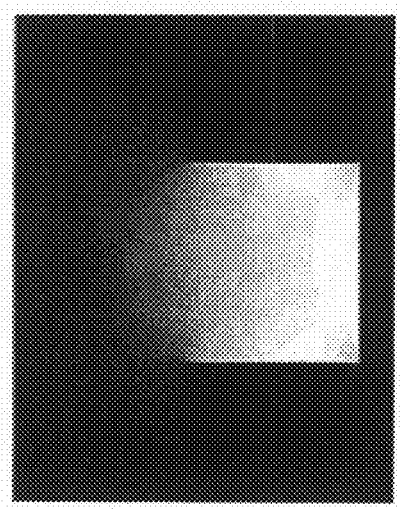
Figure 6A:
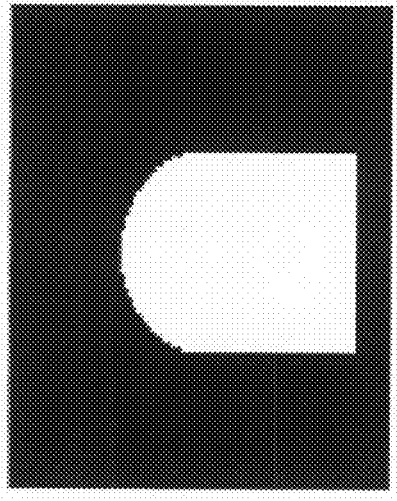
Figure 8C:
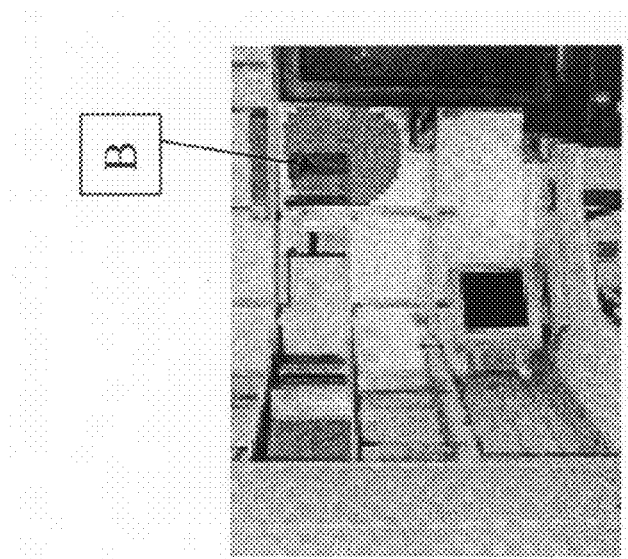
Figure 8B:
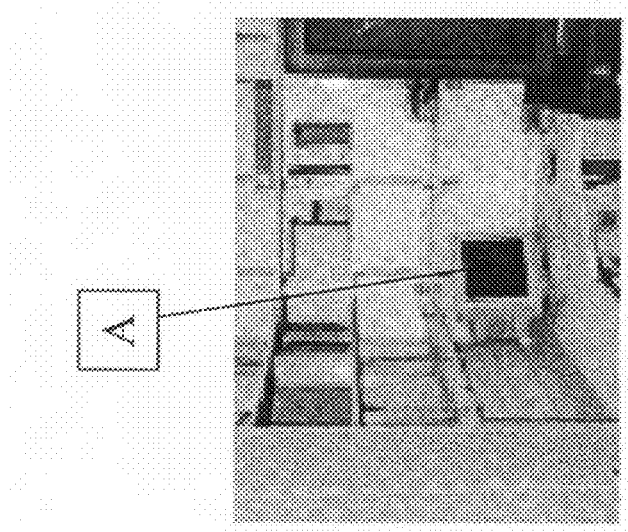
Figure 8A:
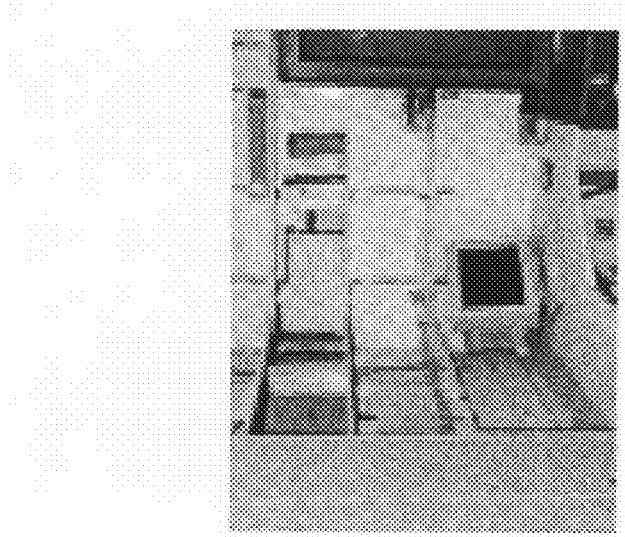
Figure 9C:
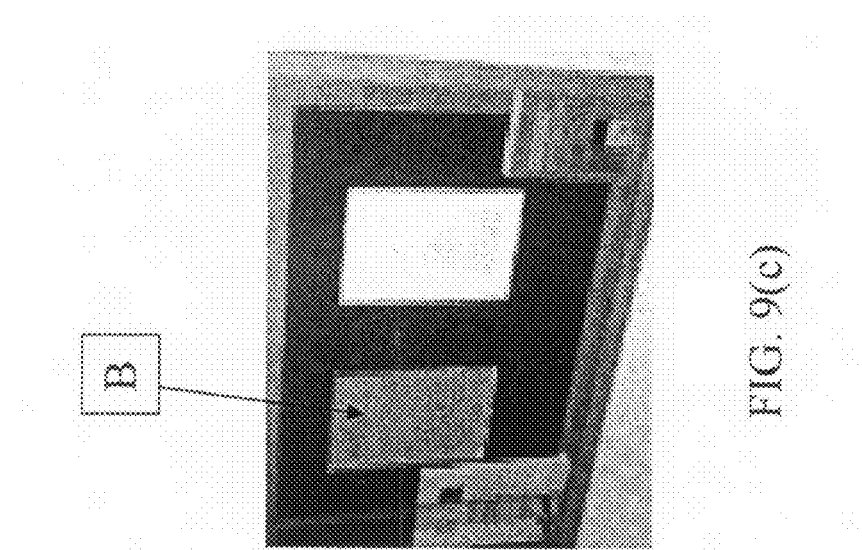
Figure 9B:
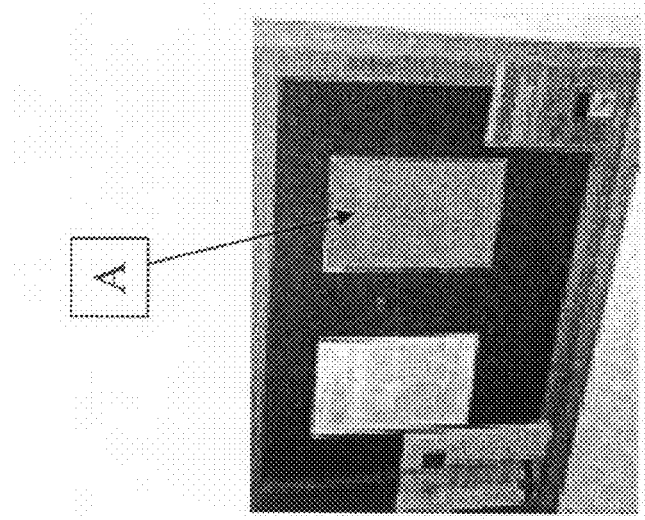
Figure 9A:
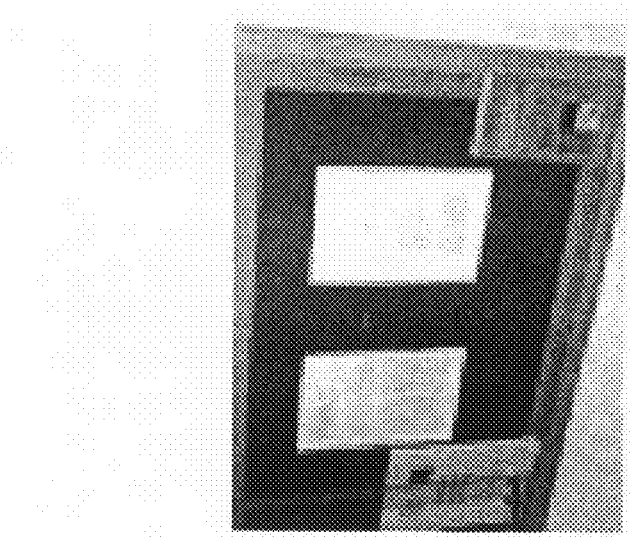
Figure 10C:
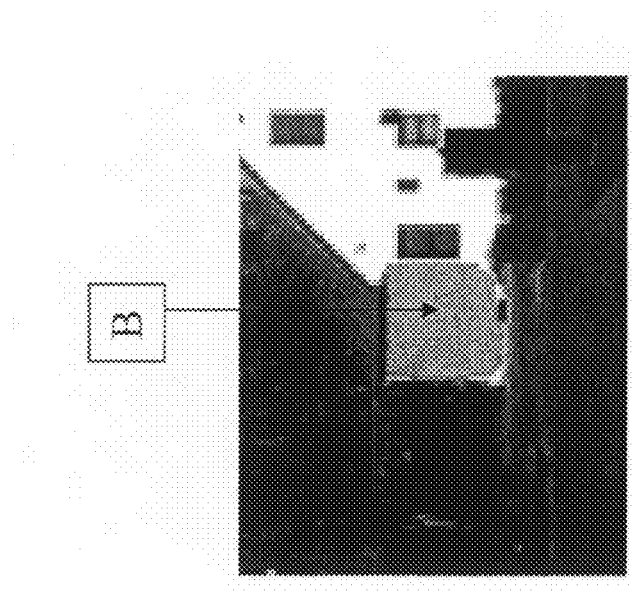
Figure 10B:
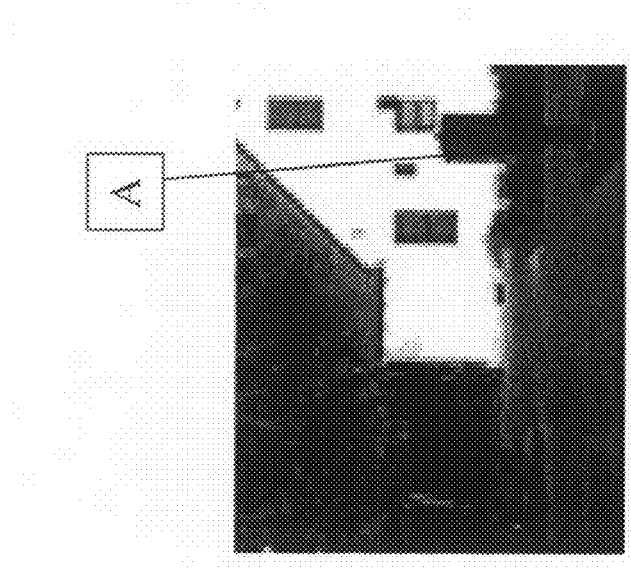
Figure 10A:
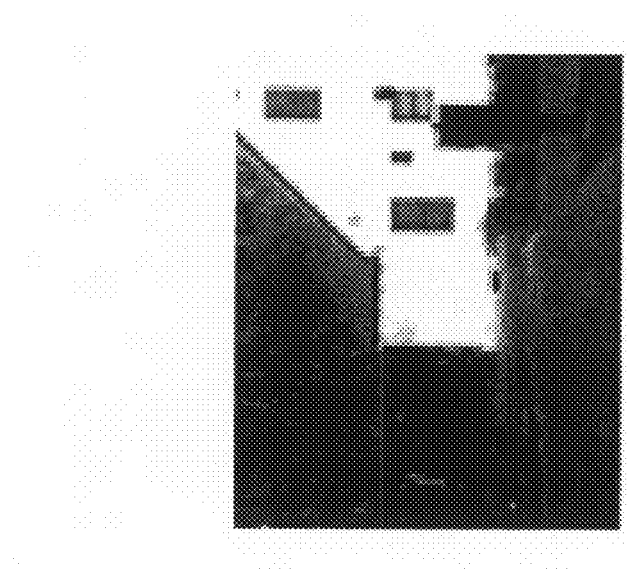
Figure 11C:
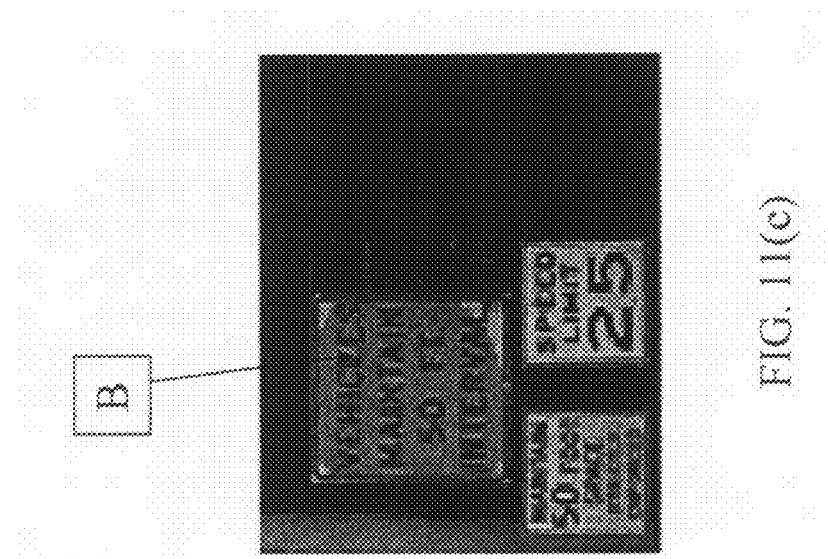
Figure 11B:
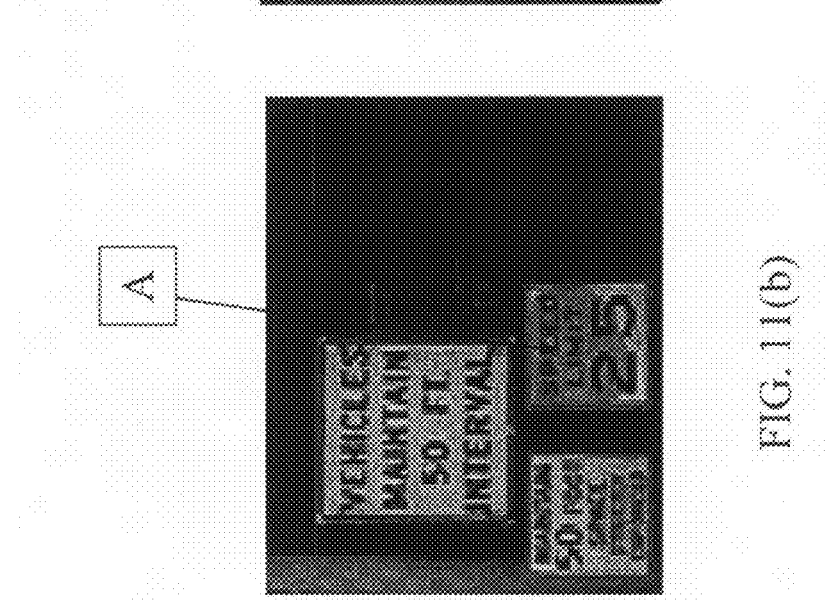
Figure 11A:
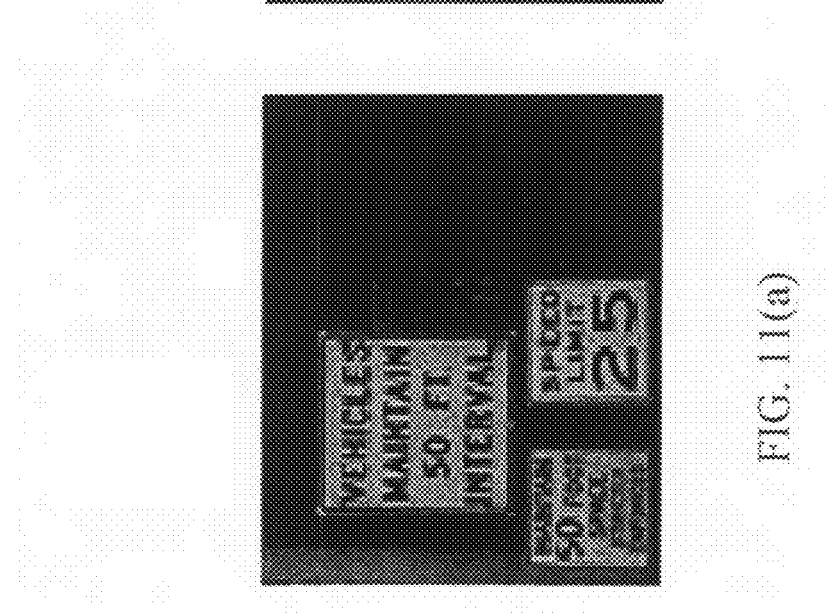

FIGS. 6(a)-6(c) illustrate the results of a segmentation on an image that is an overlapping circle and a square using the OM algorithm.

FIGS. 7(a)-7(d) illustrate the segmentation results for overlapping rectangles using the OM algorithm.

FIGS. 8(a)-11(c) illustrate the segmentation results for various natural images using the OM algorithm.

Figure 12:
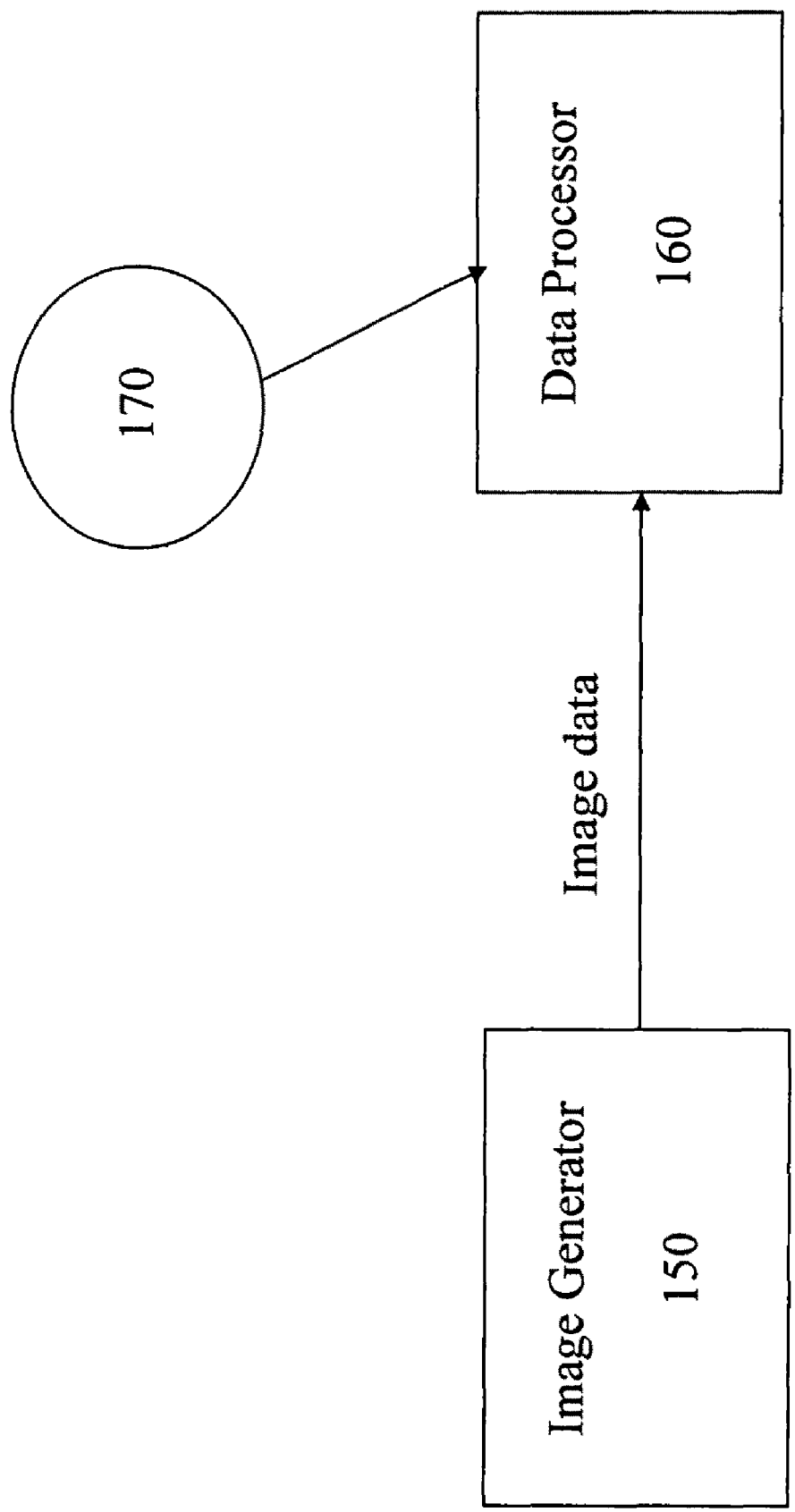

FIG. 12 is a schematic overview of the apparatus for carrying out the OM algorithm.

All drawings are schematic illustrations and the structures rendered therein are not intended to be in scale. It should be understood that the invention is not limited to the precise arrangements and instrumentalities shown, but is limited only by the scope of the claims.

DETAILED DESCRIPTION OF THE INVENTION

Ratio of Metrics—It has been shown in J. Zunic and P. Rosin, "Rectilinearity Measurements for Polygons," *IEEE Trans. on PAMI*, 25(9):1193-1200, September 2003 that the only class of shapes which minimize the following ratio of perimeter metrics, $$\frac{Per_1(P)}{Per_2(P)}, \tag{1}$$

are rectilinear shapes (with respect to the specified X and Y axis). Here $Per_1(P)$ denotes the $l_1$ perimeter of shape P according to the specified X and Y axis defined as:

$$Per_1(P) = \int |u'(t)| + |v'(t)| dt, \tag{2}$$

and $Per_2(P)$ denotes the perimeter of shape P with the $l_2$ metric defined as:

$$Per_2(P) = \int \sqrt{u'^2(t) + v'^2(t)} dt, \tag{3}$$

for some parametrization u(t), v(t) of the shape boundary P. According to an embodiment, the OM algorithm formulates the perimeter ratio (1) in such a way that it is possible to find a segmentation of a rectilinear shape in an image that minimizes this perimeter ratio.

Approximating the Metrics—The perimeter metrics $Per_1(P)$ and $Per_2(P)$ can be approximated using the Laplacian matrices and give an integer programming formulation. In order to represent the metrics in terms of a segmentation defined on the nodes of the graph Laplacian matrix, we begin by formalizing our notation for a graph. A graph consists of a pair G=(V, E) with vertices (nodes) v∈V and edges e∈E ⊆V×V. An edge, e, spanning two vertices, $v_i$ and $v_j$, is denoted by $e_{ij}$. A weighted graph assigns a weight value to each edge. The weight of an edge, $e_{ij}$, is denoted by $w(e_{ij})$ or $w_{ij}$. The degree of a vertex is $d_i = \Sigma w(e_{ij})$ for all edges $e_{ij}$ incident on $v_i$. The following will also assume that our graph is connected and undirected (i.e., $w_{ij} = w_{ji}$). An image may be associated with a graph by identifying each pixel with a node and defining an edge set to represent the local neighborhood relationship of the pixels. The edge set (neighborhood) structure will be used to represent the opposing metric spaces.

First, an indicator vector x representing a segmentation is defined as $$x_i = \begin{cases} 1 & \text{if object,} \\ 0 & \text{if background} \end{cases} \tag{4}$$

and the graph Laplacian matrix, L, is defined as $$L_{ij} = \begin{cases} d_i & \text{if } i = j \\ -w_{ij} & \text{if } v_i \text{ and } v_j \text{ are adjacent nodes,} \\ 0 & \text{otherwise,} \end{cases} \tag{5}$$

where $L_{ij}$ is indexed by vertices $v_i$ and $v_j$. Given a segmentation (represented by indicator vector x), the weighted cost of the cut (perimeter), C, may be written as $$C = x^T L x = \sum_{ij} w_{ij} (x_i - x_j)^2. \tag{6}$$

Now, using (6) the perimeter of the object is given weighted cost with respect to various metrics by designing the appropriate weighting/topology according to Y. Boykov and V. Kolmogorov, "Computing Geodesics and Minimal Surfaces via Graph Cuts," *In Proceedings of International Conference on Computer Vision*, Vol. 1, October 2003. Then, assumption is made that the pixel (node) spacing is at one unit in each direction. For the $l_1$ metric, we employ a four-connected grid with weighting $$w_{ij} = \begin{cases} \frac{1}{2}, & \text{if nodes } v_i \text{ and } v_j \text{ are adjacent in the grid,} \\ 0, & \text{Otherwise.} \end{cases} \quad (7)$$

The Laplacian matrix for this topology/weighting $w_{ij}$ is denoted as $L_1$.

Similarly, the length of the boundary using any Riemannian metric can be approximated with an appropriately weighted graph as shown by Boykov and Kolmogorov, "Computing Geodesics and Minimal Surfaces via Graph Cuts." In this approximation to the $L_2$ metric, each node is connected to every other node within a distance R. Hence, where $L_2$ denotes the Laplacian matrix of $l_2$ metric, $\lim_{\delta \to 0} x^T L_2 x = \text{Per}_2(\Omega x)$ for grid spacing $\delta$ and $E_k \subset E$ indicates the edge family incident on node $v_k$, where all edges are sorted according to their angle $\phi_i$, the weight of each edge is computed as $$w_i = \frac{\delta^2 \Delta \phi_k}{2|e_i|} \quad (8)$$

for $e_i \in E_k$. Here, $\Delta \phi_k$ stands for the angle between two edges in $E_k$, and $|e_i|$ is the magnitude of this edge's direction. Therefore, in terms of an indicator vector x on a graph, we may rewrite the ratio (1) as $$\frac{Per_1(\Omega x)}{Per_2(\Omega x)} \approx \frac{x^T L_1 x}{x^T L_2 x}. \quad (9)$$

Figure 2B:
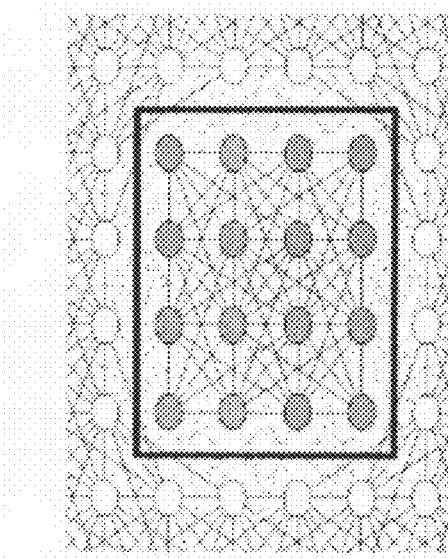
FIGS. 2(a)-2(d) illustrate exemplary graphs illustrating cuts of rectangles and triangles as measured by graphs with different topologies.
Figure 2D:
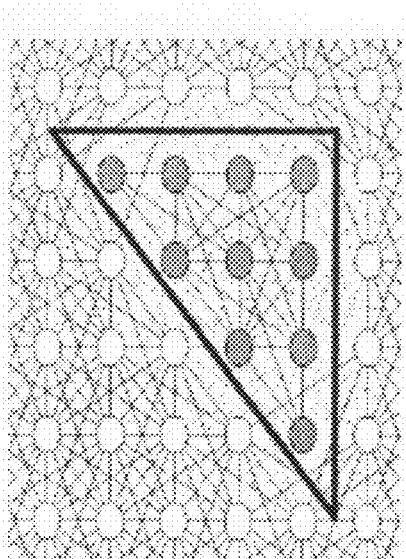
Figure 2A:
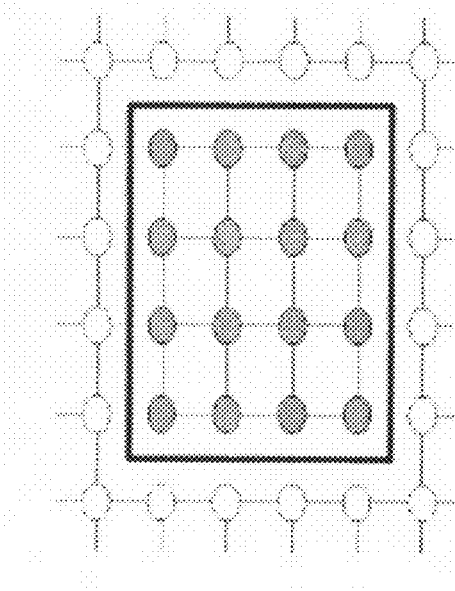
Figure 2C:
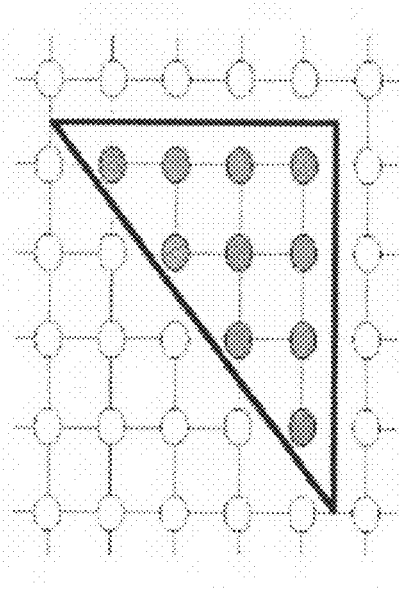

FIGS. 2(a)-2(d) show examples of graphs representing the Laplacian matrices $L_1$ and $L_2$ with a neighborhood of two. FIGS. 2(a) and 2(b) are $L_1$ and $L_2$ graphs, respectively, showing induced cuts by a rectangle. FIGS. 2(c) and 2(d) are $L_1$ and $L_2$ graphs, respectively, showing induced cuts by a triangle. The sample perimeter ratios for a triangle and a rectangle cuts are:

$$\frac{Per_1}{Per_2} = \frac{16}{13.9192} \approx 1.1495$$

for rectangle cut and $$\frac{Per_1}{Per_2} = \frac{16}{11.8317} \approx 1.3523$$

for triangle cut. As desired, the rectangle has a smaller ratio. Therefore, we may search for rectilinear shapes by solving the following optimization term:

$$\operatorname*{argmin}_x \frac{x^T L_1 x}{x^T L_2 x}, \quad (10)$$

subject to $[x \in \{0,1\}^N]$, where N is the size of the graph (e.g. the number of total pixels).

To incorporate image information (shape priors) into this segmentation, an image gradient based approach similar to the one described in T. Cour, F. Benezit and J. Shi, "Spectral Segmentation with Multiscale Graph Decomposition," Computer Society Conference on Computer Vision and Pattern Recognition (CVPR '05), Vol. 2, pp. 1124-1131, IEEE, 2005 can be used. Each edge weight of the $L_2$ graph is modulated with the following term $$\tilde{w}k = e\frac{\alpha}{\eta}\max_j \text{Edge}(j, k). \quad (11)$$

Here, $\max_j \text{Edge}(j, k)$ gives the maximum edge magnitude along the line spanned by edge k. $\alpha > 0$ is the desired edge width and $\eta$ is the normalization term such that $\eta = \max_k \max_j \text{Edge}(j,k)$. Since the edge magnitude is being maximized with respect to $L_2$, this modification would force the segmented object to favor boundaries that align with the image intensities.

Solve the generalized eigenvector problem—In order to solve the optimization term (10), we relax the integer constraint and allow the $x_i$'s to take continuous values. Noting that this expression is the Rayleigh quotient, the optimal value of the optimization term (10) is achieved by the generalized eigenvalue and eigenvector pair $\lambda$, x of equation $L_2 x = \lambda L_1 x$ corresponding to the smallest nonzero generalized eigenvalue.

One concern with the above formulation is that an object segmentation sharing its boundary with the image border has no penalty, i.e., there is no cost associated with labeling a node on the border as foreground or background. This situation encourages the segmented object boundary to coincide with the image borders. Since objects sharing their boundaries with the image border should not be favored over interior objects, a regularization term is added to the optimization term (10) in the following way:

$$\operatorname*{argmin}_x \frac{x^T(L_1 + \gamma I_b)x}{x^T L_2 x}, \quad (12)$$

where $I_b$ is a diagonal indicator matrix for nodes on the image borders, and $\gamma$ is a predefined value.

Find a Binary Segmentation—After having obtained a real-valued solution to the optimization term (10), a binary segmentation is produced by finding the threshold of the solution x that minimizes the expression (12). Because of the additional boundary term, both $S = \{i | x_i \geq \tau\}$ and $\overline{S} = \{i | x_i \leq \tau\}$ have to be checked and select the one with the higher objective value. It should be noted that since this operation takes linear time, the overall time complexity is not affected. See L. Grady and E. L. Schwartz, "Isoperimetric Graph Partitioning for Image Segmentation," *IEEE Trans. on Pat. Anal. And Mach. Int.*, 28(3):469-475, March 2006.

Multiple Overlapping Objects Segmentation—Although the remaining eigenvectors give a solution for K-way segmentation in the case of the Normalized Cut method, see S. X. Yu and J. Shi, "Multiclass Spectral Clustering," *In Ninth IEEE International Conference on Computer Vision*, Vol. 1, pp. 313-319, Nice, October 2003, IEEE Computer Society, it is not possible to recover two overlapping objects with such a device. Because, segmentation of overlapping shapes such as overlapping rectangles is highly desirable in some applications, we must look beyond the remaining eigenvectors for this purpose.

One method of addressing the problem of segmenting overlapping objects is given by the following approach. After computing and discretizing the current segmentation, edges of $L_2$ graph are separated according to whether or not the edges lie on a previous cut (e.g. a previous segmentation). Then, η for each edge group is computed separately. Moreover, the edge weights in the cut group are further multiplied with a decaying constant $0 \leq \beta < 1$. Finally, these new weights are modulated by the original edge weights of $L_2$ graph and another segmentation is computed.

The main computational burden of this method is the solution of the generalized eigenvectors. One approach is to find the Cholesky decomposition of $L_1 + \gamma I_b = AA^T$ (since $L_1 + \gamma I_b > 0$), solve for the maximum eigenvector of $A^{-T} L_2 A^{-1}$ and then recover the solution for original problem by computing Ax. In order to compute the Cholesky decomposition of matrix $L_1 + \gamma I_b$, we find a permutation of this matrix which is likely to be sparser using the AMD package of P. Amestoy, T. Davis and I. Duff, "Algorithm 8xx: AMD, an approximate minimum degree ordering algorithm," *ACM Trans. on Math, Software,* 30(3):381-388, September 2004. After this step, we compute the Cholesky decomposition (see G. Golub and C. Van Loan, "Matrix Computations," *The Johns Hopkins University Press,* 3$^{rd}$ Edition, 1996), and solve the resulting sparse eigenvalue problem with ARPACK (see R. B. Lehoucq, D. C. Sorenson and C. Yang, "ARPACK User's Guide: Solution of Large-Scale Eigenvalue Problems with Implicitly Restarted Arnoldi Methods," SIAM, 1998).

Comparison to the Normalized Cuts algorithm—The formulation given in the optimization term (10) may resemble the well-known Normalized Cuts criterion for image segmentation, which uses an optimization criterion of $$\operatorname*{argmin}_x \frac{x^T(D-W)x}{x^T D x} = \operatorname*{argmin}_x \frac{x^T L_2 x}{x^T D x}, \qquad (13)$$

where D represents a diagonal matrix consisting only of the diagonal of $L_2$. See J. Shi and J. Malik, "Normalized Cuts and Image Segmentation," *IEEE PAMI,* 22(8):888-905, August 2000. However, the Normalized Cuts algorithm is not suitable for segmenting rectilinear shapes.

Next, the OM algorithm of the invention is applied to finding rectilinear shapes in an image by addressing the following questions: (a) whether the algorithm successfully chooses a rectilinear shape among several candidate shapes; (b) the effect of scale and rotation on the segmentation; (c) whether the algorithm can find rectilinear shapes when the object is missing parts of its boundary; (d) whether the proposed scheme for K-way segmentation successfully find overlapping objects; and (e) whether the algorithm can find rectilinear segments in natural images.

Figure 3C:
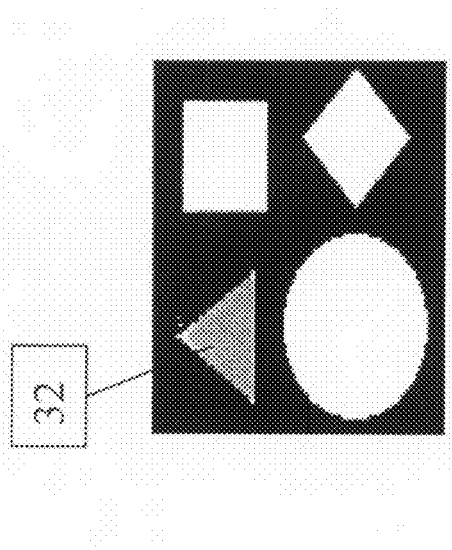
FIGS. 3(a)-3(e) illustrate segmentation result of multiple geometric objects in order of their selection as "rectilinear" shapes.
Figure 3B:
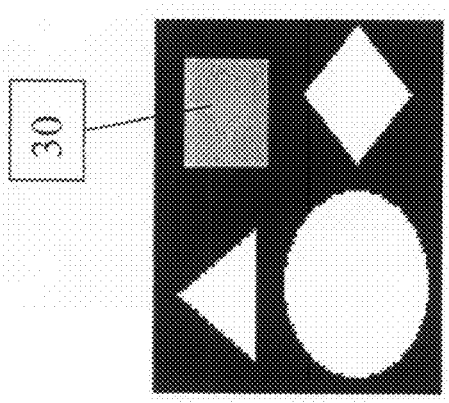
Figure 3A:
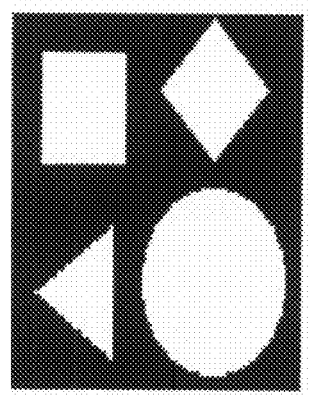
Figure 3E:
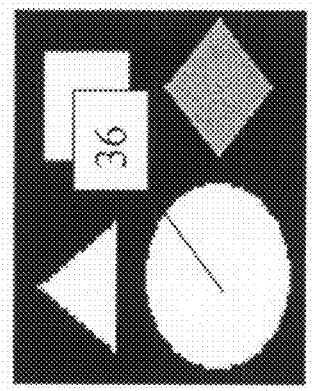
Figure 3D:
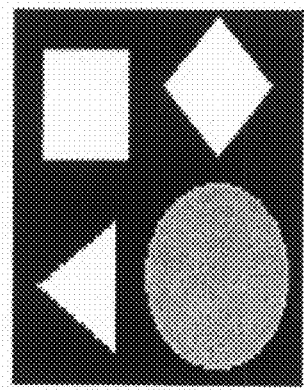

Object Choice Among Different Shapes—FIGS. 3(a)-3(e) illustrate the algorithm's ability to choose a rectilinear shape from among a collection of objects in an image. FIG. 3(a) is the original image and FIGS. 3(b)-3(e) illustrate the order in which the shapes are selected by the OM algorithm. The square is initially chosen by the OM algorithm. Using the above method for finding a K-way segmentation, the objects are chosen in order of how well they optimize the optimized perimeter ratio (10). In the case of the image in FIG. 3(a), this ordering is: square, triangle, circle, diamond.

Figure 4:
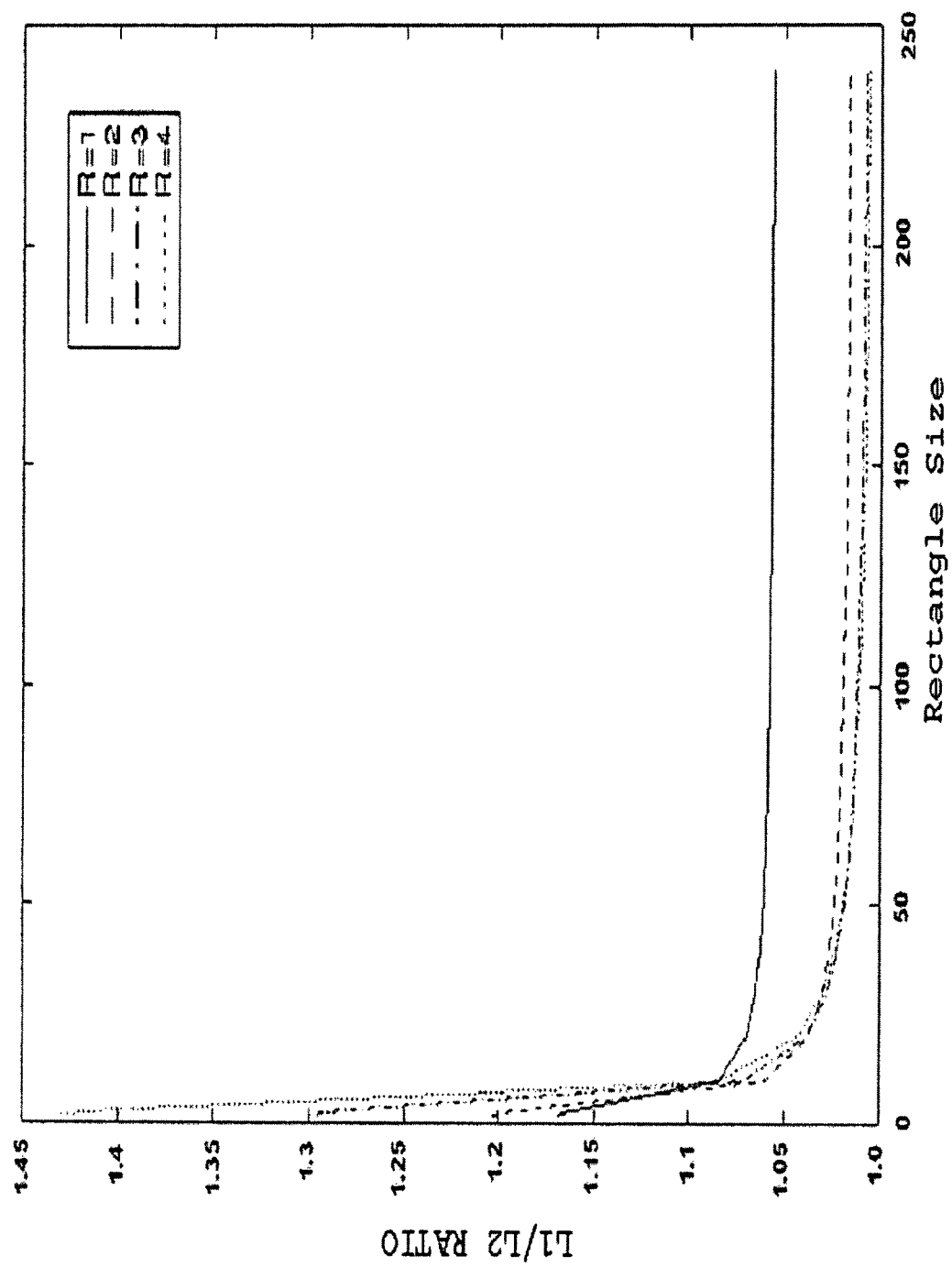
FIG. 4 is a plot showing the dependence of the perimeter ratio $$\frac{L_1}{L_2}$$

Scale (resolution) and Rotation Dependence—The characterization of the dependence of the OM algorithm on the scale (resolution) of the rectilinear shape will be described. FIG. 4 is a plot of $$\frac{L_1}{L_2}$$

v. rectangle size in pixels per side showing the dependence of the ratio $$\frac{L_1}{L_2}$$

on the size of a square and on a different approximation (neighborhood size) of the $L_2$ perimeter metric (graph). It may be seen from FIG. 4 that there is a weak preference for larger rectilinear shapes, but the strength of this preference is strongly diminished after the square reaches a size of roughly 50-100 pixels on each side. Additionally, FIG. 4 shows that a R=3 or R=4 to approximate the Euclidean ($L_2$) metric is sufficient. As expected, an increased neighborhood size and square size drive the metric ratio toward unity.

Clearly, the OM algorithm is not rotation-independent. A diamond (rotated square) maximizes the optimization term (10) and, thus, the last object chosen in FIG. 3. However, one would expect that the slight rotation of a rectilinear shape would not substantially corrupt the results. One may approach this issue analytically by solving for the rotation of a square that causes a circle to have a smaller objective ratio, as expressed in the optimization term (10). For a circle of radius r, the perimeter ratio is $$\frac{Per_1}{Per_2} = \frac{8r}{2\pi r} = \frac{4}{\pi}. \qquad (14)$$

For a square with side length 2r rotated Θ degrees, the perimeter ratio is $$\frac{Per_1}{Per_2} = \frac{8r}{8r(\sin\Theta + \cos\Theta)} = \frac{\sqrt{2}}{2\sin(\Theta + \frac{\pi}{4})}. \qquad (15)$$

Equating (14) and (15) yields $\Theta \leq 19°$. Therefore, one would expect that a rotation of 19° degrees would cause the circle to be chosen instead of the rotated rectangle. Experimentally, the inventors created a 100×100 image consisting of a square and circle, and empirically discovered that the circle segmentation is preferred to the rotated square at approximately 17° degrees (with an $L_2$ graph of neighborhood size two).

EXAMPLE

Weak or Missing Boundaries—Real images almost always contain some weak boundaries due to poor contrast, noise, blurring artifacts or occlusion. Therefore, the OM algorithm was tested to see how well it will find objects of the appropriate shape, even in these difficult realistic circumstances. Two experiments were conducted to see how well the OM algorithm will produce the correct segmentations under these conditions. FIGS. 5(a)-5(c) illustrate the first experiment in which the OM algorithm is applied to the classic weak-boundary rectilinear shape—the Kanizsa square. FIG. 5(a) shows the original image of a Kanizsa square. FIG. 5(b) shows the minimum generalized eigenvector. FIG. 5(c) shows the shaded square shape that was segmented by the OM algorithm demonstrating that the OM algorithm will correctly segment and identify the square shape. The second experiment is shown in reference to FIGS. 6(a)-6(c) in which the OM algorithm was applied to a shape formed by joining a square to a semicircle with the same intensity. FIG. 6(a) shows the original image and FIG. 6(b) shows the minimum generalized eigenvector. FIG. 6(c) shows the shaded square shape that was segmented by the OM algorithm. As seen in the two sample experiments, the OM algorithm successfully decomposes the complex object image into its constituent parts.

Multiway Segmentation of Overlapping Objects—Further to the method for segmenting multiple, overlapping objects in a single image described above, FIGS. 7(a)-7(d) shows the results of applying the OM algorithm to segmentation of overlapping rectangles. Note that the order in which these rectangles are segmented is driven by their relative sizes and contrasts. FIG. 7(a) shows the original image of overlapping rectangles. FIG. 7(b) shows the first segmentation in which the skinny rectangle 10 is segmented. FIG. 7(c) shows the second segmentation in which the large rectangle 12 is segmented. FIG. 7(d) shows the third segmentation in which the rectangle 14 defined by the overlapping region of the first two rectangles is segmented.

Real Images—The ultimate test of the utility of the OM algorithm is its ability to operate on natural images. Therefore, the OM algorithm was tested on several natural images containing rectilinear shapes. FIGS. 8(a)-11(c) show the results of this experiment. Note that the objects range in size, contrast and rotation. FIGS. 8(a), 9(a), 10(a) and 11(a) are the original images. FIGS. 8(b), 9(b), 10(b) and 11(b) show the results of the first pass segmentation by the OM algorithm. In other words, these segmented rectilinear shapes are the ones that optimized the expression (12). The segmented portions of the images are outlined as regions A in these images. FIGS. 8(c), 9(c), 10(c) and 11(c) show the results of the second pass segmentation by the OM algorithm where the segmented portions from the first pass were blocked out from the image and allow the OM algorithm to operate on the image. Thus, the segmented rectilinear shapes outlined as regions B in these images are the ones whose optimization of the expression (12) ranks after the regions A.

Figure 1:
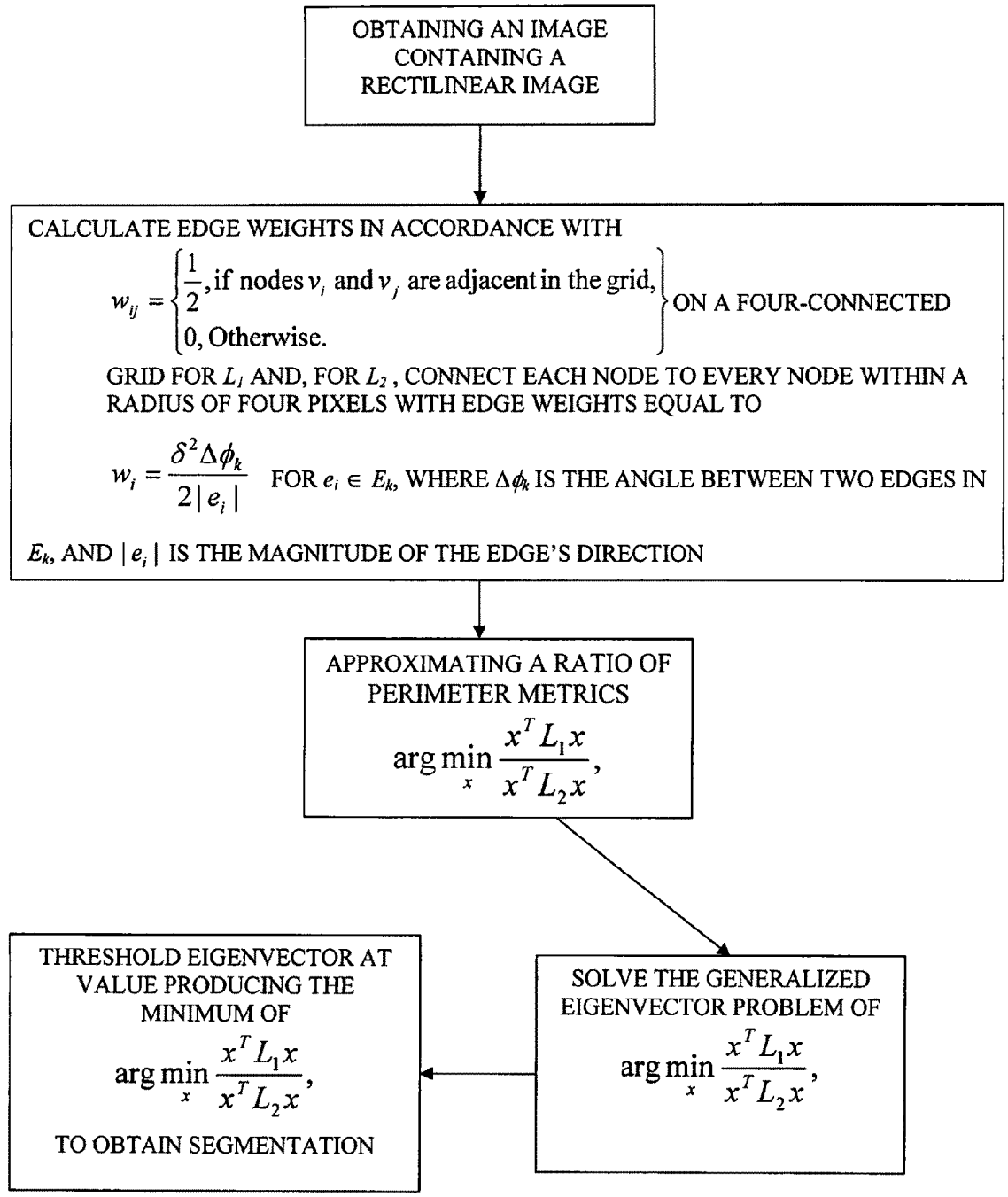
FIG. 1 is a flow chart of the OM algorithm according to an embodiment.

The OM algorithm described herein is illustrated in a flow chart format in FIG. 1. This new approach for embedding shape information into an image segmentation task described herein provides a global optimum, non-iterative, steady-state segmentation algorithm without requiring initialization in contrast to the known graph-based segmentation methods.

The invention described herein can be automated by, for example, tangibly embodying a program of instructions upon a storage media, readable by a machine/system capable of executing the instructions. Referring to FIG. 12, a data processor 160, such as a general purpose computer, is an example of such a machine/system. The computational algorithms discussed herein necessary for manipulation and processing of the image data and the program instructions to execute those algorithms as described herein to conduct the segmentation according to the invention can be embodied as a program of executable instructions upon a storage media 170. The data processor 160 can read the program of instructions from the storage media 170 and loaded on to the data processor's temporary memory devices (e.g. ROM) or its permanent memory devices (e.g. hard drives), for example, and then the data processor can execute the instructions to perform segmentation on the image data. The image data can be provided to the computer from an image generator 150 such as a digital camera, digital video camera, CT scanners, MR scanners, etc. via one of the data input ports provided on the data processor 160 as will be obvious to one of ordinary skill in the art. Examples of the storage media 170 are well know in the art and would include such devices as, a readable or writable CD, flash memory chips (e.g. thumb drives), various magnetic storage media, etc.

The essential features of the invention having been disclosed, further variations will now become apparent to persons skilled in the art. All such variations are considered to be within the scope of the appended claims. Reference should be made to the appended claims, rather than the foregoing specification, as indicating the true scope of the subject invention.

What is claimed is:

1. A method of segmenting a rectilinear object in an image forming a graph based on cuts of the object in the image, the method comprising:

(a) obtaining the image;

(b) calculating edge weights in accordance with $$w_{ij} = \begin{cases} \frac{1}{2}, & \text{if nodes } v_i \text{ and } v_j \text{ are adjacent in the grid,} \\ 0, & \text{Otherwise} \end{cases},$$

on a four-connected grid for $L_1$ and, for $L_2$, connect each node to every node within a radius of four pixels with edge weights equal to $$w_i = \frac{\delta^2 \Delta \phi_k}{2|e_i|}, \quad \text{for } e_i \in E_k,$$

where $\delta$ is grid spacing, $\Delta \phi_k$ is the angle between two edges in $E_k$, $E_k \subset E$ indicates the edge family incident on node $v_k$, i and j represent pixels in the image, and $|e_i|$ is the magnitude of this edge's direction;

(c) approximating a ratio of perimeter metrics $$\underset{x}{\operatorname{argmin}} \frac{x^T L_1 x}{x^T L_2 x},$$

subject to $[x \in \{0,1\}^N]$, where N is the size of the graph, for the object by constructing Laplacian matrices $L_1$ and $L_2$ for the image;

(d) relaxing an integer constraint on the ratio of perimeter metrics, resulting in a generalized eigenvector problem;
(e) solving the generalized eigenvector problem; and
(f) finding a binary segmentation from the eigenvector solution by thresholding the eigenvector to produce a binary indicator vector that minimizes said ratio of perimeter metrics, wherein said step of approximating the ratio of perimeter metrics includes modulating each edge weight of $L_2$-graph.

2. The method of claim 1, wherein each edge weight of the $L_2$ graph is modulated with term $$\tilde{w}k = e\frac{\alpha}{\eta}\max_j \text{Edge}(j, k),$$

where j and k represent pixels in the image, $\max_j$ Edge(j, k) provides the maximum edge magnitude along the line spanned by edge k, $\alpha>0$ is the desired edge width and $\eta$ is the normalization term such that $\eta=\max_k \max_j$ Edge(j, k), thus forcing the segmented object to favor boundaries that align with intensities of the image.

3. The method of claim 2, wherein the step of approximating the ratio of perimeter metrics includes adding a regularization term to the ratio of perimeter metrics to $$\arg\min_x \frac{x^T(L_1 + \gamma I_b)x}{x^T L_2 x},$$

where $I_b$ is a diagonal indicator matrix for nodes on image borders so that objects sharing their boundaries with a border of the image is not favored over interior objects, and $\gamma$ is a predefined value.

4. The method of claim 3, wherein the step of solving the generalized eigenvector problem includes finding Cholesky decomposition of $L_1+\gamma I_b=AA^T$ -(since $L_1+\gamma I_b>0$), where A is a Cholesky decomposition factor of $L_1+\gamma I_b$;
solving for the maximum eigenvector of $A^{-T}L_2 A^{-1}$; and
recovering a solution for original problem by computing Ax.

5. The method of claim 1, further comprising:
separating the edges of $L_2$ graph according to whether or not the edges lie on a previous cut;
multiplying a decaying constant $0\leq\beta<1$ to the edge weights in a cut group;
modulating the new weights by original edge weights of $L_2$ graph and conducting the next segmentation to segment an overlapping object.

6. The method of claim 2, further comprising:
separating the edges of $L_2$ graph according to whether or not the edges lie on a previous cut;
computing $\eta$ for each edge weight group separately;
multiplying a decaying constant $0\leq\beta<1$ to the edge weights in a cut group;
modulating the new weights by original edge weights of $L_2$ graph and conducting the next segmentation to segment an overlapping object.

7. A program storage device readable by a machine, tangibly embodying a program of instructions executable by the machine to perform method steps for segmenting a rectilinear object in an image forming a graph based on cuts of the object in the image, the method steps comprising:

(a) obtaining the image;
(b) calculating edge weights in accordance with $$w_{ij} = \begin{cases} \frac{1}{2}, & \text{if nodes } v_i \text{ and } v_j \text{ are adjacent in the grid,} \\ 0, & \text{Otherwise} \end{cases},$$

on a four-connected grid for $L_1$ and, for $L_2$, connect each node to every node within a radius of four pixels with edge weights equal to $$w_i = \frac{\delta^2 \Delta\phi_k}{2|e_i|} \text{ for } e_i \in E_k,$$

where $\delta$ is grid spacing, $\Delta\phi$hd k is the angle between two edges in $E_k$, $E_k \subset E$ indicates the edge family incident on node $v_k$, i and j represent pixel in the image, and $|e_i|$ is the magnitude of this edge's direction;
(c) approximating a ratio of perimeter metrics $$\arg\min_x \frac{x^T L_1 x}{x^T L_2 x},$$

subject to $[x \in \{0,1\}^N]$, where N is the size of the graph, for the object by constructing Laplacian matrices $L_1$ and $L_2$ for the image;
(d) relaxing an integer constraint on the ratio of perimeter metrics, resulting in a generalized eigenvector problem;
(e) solving the generalized eigenvector problem; and
(f) finding a binary segmentation from the eigenvector solution by thresholding the eigenvector to produce a binary indicator vector that minimizes said ratio of perimeter metrics, wherein said step of approximating the ratio of perimeter metrics includes modulating each edge weight of $L_2$-graph.

8. The device of claim 7, wherein each edge weight of the $L_2$ graph is modulated with term $$\tilde{w}k = e\frac{\alpha}{\eta}\max_j \text{Edge}(j, k),$$

where j and k represent pixel in the image, $\max_j$ Edge(j, k) provides the maximum edge magnitude along the line spanned by edge k, $\alpha>0$ is the desired edge width and $\eta$ is the normalization term such that $\eta=\max_k \max_j$ Edgedm (j, k), thus forcing the segmented object to favor boundaries that align with intensities of the image.

9. The device of claim 8, wherein the step of approximating the ratio of perimeter metrics includes adding a regularization term to the ratio of perimeter metrics to $$\arg\min_x \frac{x^T(L_1 + \gamma I_b)x}{x^T L_2 x}$$

where $I_b$ is a diagonal indicator matrix for nodes on image borders so that objects sharing their boundaries with a border of the image is not favored over interior objects, and $\gamma$ is a predefined value.

10. The device of claim 9, wherein the step of solving the generalized eigenvector problem includes finding Cholesky decomposition of $L_1+\gamma I_b = AA^T$ -(since $L+\gamma I_b \geq 0$), where A is a Cholesky decomposition factor of $L_1+\gamma I_b$;

solving for the maximum eigenvector of $A^{-T} L_2 A^{-1}$; and
recovering a solution for original problem by computing Ax.

11. The device of claim 7, wherein the method further comprises:
separating the edges of $L_2$ graph according to whether or not the edges lie on a previous cut;
multiplying a decaying constant $0 \leq \beta < 1$ to the edge weights in a cut group;
modulating the new weights by original edge weights of $L_2$ graph and conducting the next segmentation to segment an overlapping object.

12. The device of claim 8, wherein the method further comprises:
separating the edges of $L_2$ graph according to whether or not the edges lie on a previous cut;
computing $\eta$ for each edge weight separately;
multiplying a decaying constant $0 \leq \beta < 1$ to the edge weights in a cut group;
modulating the new weights by an original edge weights $L_2$ graph and conducting the next segmentation to segment an overlapping object.

13. A system for segmenting a rectilinear object in an image forming a graph based on cuts of the object in the image, the system comprising:
means for reading a program of executable instructions tangibly embodied in a storage media;
a means for storing the program of executable instructions, the executable instructions containing instructions for perform method steps for segmenting a rectilinear object in an image, the method steps comprising:
(a) obtaining the image;
(b) calculating edge weights in accordance with $$w_{ij} = \begin{cases} \frac{1}{2}, & \text{if nodes } v_i \text{ and } v_j \text{ are adjacent in the grid} \\ 0, & \text{Otherwise.} \end{cases}$$

on a four-connected grid for $L_1$ and, for $L_2$, connect each node to every node within a radius of four pixels with edge weights equal to $$w_i = \frac{\delta^2 \Delta \phi_k}{2|e_i|}, \text{ for } e_i \in E_k,$$

where $\delta$ is grid spacing, $\Delta \phi_k$ is the angle between two edges in $k$, $E_k \subset E$ indicates the edge family incident on node $v_k$, i and j represent pixel in the image, and $|e_i|$ is the magnitude of this edge's direction;
(c) approximating a ratio of perimeter metrics $$\arg\min_x \frac{x^T L_1 x}{x^T L_2 x},$$

subject to $[x \in \{0,1\}^N]$, where N is the size of the graph, for the object by constructing Laplacian matrices $L_1$ and $L_2$ for the image;

(d) relaxing an integer constraint on the ratio of perimeter metrics, resulting in a generalized eigenvector problem;
(e) solving the generalized eigenvector problem; and
(f) finding a binary segmentation from the eigenvector solution by thresholding the eigenvector to produce a binary indicator vector that minimizes said ratio of perimeter metrics, wherein said step of approximating the ratio of perimeter metrics includes modulating each edge weight of $L_2$-graph; and
a data processor for reading the program of executable instructions from the storage media and executing the executable instructions.

14. The system of claim 13, wherein each edge weight of the $L_2$ graph is modulated with term $$\tilde{w}k = e \frac{\alpha}{\eta} \max_j \text{ Edge}(j, k).$$

where j and k represent pixel in the image, $\max_j$ Edge(j, k) provides the maximum edge magnitude along the line spanned by edge k, $\alpha > 0$ is the desired edge width and $\eta$ is the normalization term such that $\eta = \max_k \max_j$ Edge(j, k), thus forcing the segmented object to favor boundaries that align with intensities of the image.

15. The system of claim 14, wherein the step of approximating the ratio of perimeter metrics includes adding a regularization term to the ratio of perimeter metrics to $$\arg\min_x \frac{x^T (L_1 + \gamma I_b) x}{x^T L_2 x}$$

where $I_b$ is a diagonal indicator matrix for nodes on the image borders so that objects sharing their boundaries with a border of the image is not favored over interior objects, and $\gamma$ is a predefined value.

16. The system of claim 15, wherein the step of solving the generalized eigenvector problem includes finding Cholesky decomposition of $L_1+\gamma I_b = AA^T$-(since $L_1+\gamma I_b > 0$), where A is a Cholesky decomposition factor of $L_1+\gamma I_b$;
solving for the maximum eigenvector of $A^{-T} L_2 A^{-1}$; and
recovering a solution for original problem by computing Ax.

17. The system of claim 13, wherein the method further comprises:
separating the edges of $L_2$ graph according to whether or not the edges lie on a previous cut;
multiplying a decaying constant $0 \leq \beta < 1$ to the edge weights in a cut group;
modulating the new weights by an original edge weights of $L_2$ graph and conducting the next segmentation to segment an overlapping object.

18. The system of claim 14, wherein the method further comprises:
separating the edges of $L_2$ graph according to whether or not the edges lie on a previous cut;
computing $\eta$ for each edge weight separately;
multiplying a decaying constant $0 \leq \beta < 1$ to the edge weights in a cut group;
modulating the new weights by an original edge weights of $L_2$ graph and conducting the next segmentation to segment an overlapping object.

* * * * *